United States Patent
Doi

(10) Patent No.: US 8,458,378 B2
(45) Date of Patent: Jun. 4, 2013

(54) CABLE

(75) Inventor: Takashi Doi, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 316 days.

(21) Appl. No.: 12/860,034

(22) Filed: Aug. 20, 2010

(65) Prior Publication Data

US 2011/0162030 A1    Jun. 30, 2011

(30) Foreign Application Priority Data

Dec. 25, 2009    (JP) .................................. 2009-295636

(51) Int. Cl.
*G06F 13/00*    (2006.01)

(52) U.S. Cl.
USPC .............................................. 710/31; 710/38

(58) Field of Classification Search
None
See application file for complete search history.

(56) References Cited

U.S. PATENT DOCUMENTS

| | | | | |
|---|---|---|---|---|
| 2007/0233906 A1* | 10/2007 | Tatum et al. | ..................... | 710/26 |
| 2007/0285582 A1* | 12/2007 | Hongo et al. | ................. | 348/723 |
| 2010/0119236 A1* | 5/2010 | Uno et al. | ..................... | 398/141 |

FOREIGN PATENT DOCUMENTS

| | | |
|---|---|---|
| JP | 2004-241361 | 8/2004 |
| JP | 2005-134712 | 5/2005 |
| JP | 2005-167867 | 6/2005 |
| JP | 2006-050292 | 2/2006 |
| JP | 2006-310197 | 11/2006 |
| JP | 2007-053675 | 3/2007 |
| JP | 2008-72419 | 3/2008 |
| JP | 2008-515343 | 5/2008 |
| JP | 2009-015041 | 1/2009 |
| JP | 2009-123652 | 6/2009 |
| JP | 2009-130680 | 6/2009 |
| JP | 2009-177600 | 8/2009 |
| JP | 2009-194511 | 8/2009 |

OTHER PUBLICATIONS

Japanese Office Action dated Oct. 5, 2010, filed in Japanese counterpart Application No. 2009-295636, 4 pages (in English).

* cited by examiner

*Primary Examiner* — Idriss N Alrobaye
*Assistant Examiner* — Zachary K Huson
(74) *Attorney, Agent, or Firm* — Patterson & Sheridan, LLP

(57) ABSTRACT

According to one embodiment, a cable includes a first plug and a second plug, a voltage application line which is formed by a metal wire connected between the first plug and the second plug, and to which a voltage is applied from one of the first plug and the second plug, a plurality of optical fibers which are connected between the first plug and the second plug, and transmit a video signal, and a controller connected to the voltage application line, and configured to detect a transmission direction of the video signal between the first plug and the second plug by sensing a change in voltage of the voltage application line and perform processing in accordance with the detected transmission direction.

10 Claims, 5 Drawing Sheets

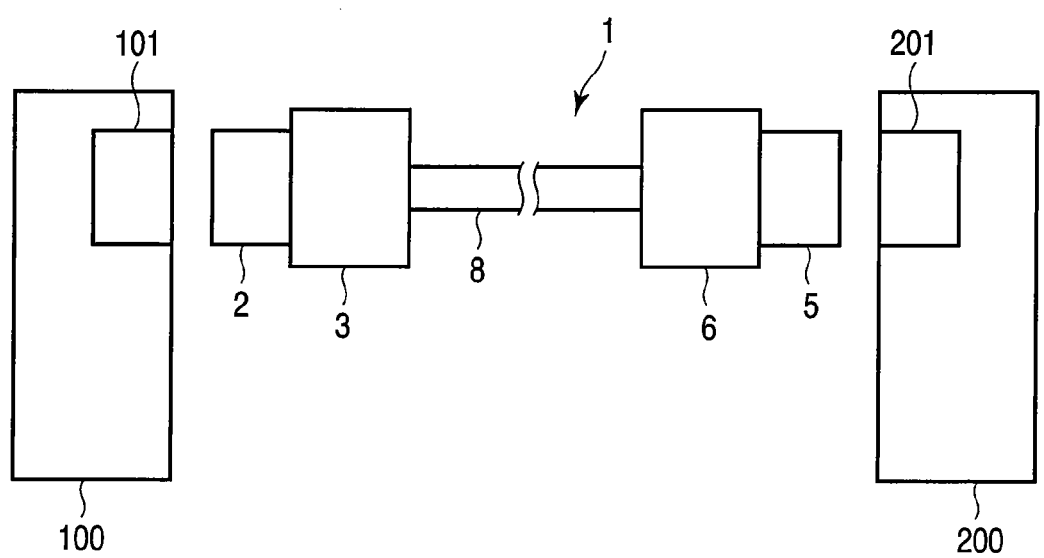
F I G. 1

CABLE

CROSS-REFERENCE TO RELATED APPLICATIONS

This application is based upon and claims the benefit of priority from Japanese Patent Application No. 2009-295636, filed Dec. 25, 2009; the entire contents of which are incorporated herein by reference.

FIELD

Embodiments described herein relate generally to a cable.

BACKGROUND

Generally, the Digital Visual Interface (DVI) standard is known as the connection standard of personal computers and displays, and the High-Definition Multimedia Interface (HDMI) standard, for example, is known as the interface standard between audiovisual apparatuses. It is disclosed by, for example, Jpn. Pat. Appln. KOKAI Publication Nos. 2006-310197 and 2008-72419. The HDMI standard is obtained by improving the DVI standard having a video transmission function by, e.g., adding an audio transmission function.

An HDMI cable complying with the HDMI standard is used as it is connected to a transmitter and receiver. The HDMI cable includes a Transition Minimized Differential Signaling (TMDS) transmission unit, +5V-power transmission unit, Hot Plug Detect (HPD) signal line, Extended Display Identification Data (EDID) signal transmission unit, and Consumer Electronics Control (CEC) signal line.

The TMDS signal transmission unit transmits a video signal containing a video component and audio component from the transmitter to the receiver. The +5V-power transmission line applies a voltage of +5 V from the transmitter to the receiver when the HDMI cable is connected to the transmitter and receiver. This notifies the receiver that the HDMI cable is connected to the transmitter and receiver. The HPD signal line transmits, from the receiver to the transmitter, an HPD signal indicating that the receiver is ready for the reception of a video signal. The EDID signal transmission unit bidirectionally transmits an EDID signal between the transmitter and receiver. Accordingly, authentication can be performed between the transmitter and receiver. The CEC signal line bidirectionally transmits a CEC signal between the transmitter and receiver. This makes it possible to control the whole system.

The above-mentioned HDMI cable uni-directionally transmits a video signal from the transmitter to the receiver. When transmitting a video signal at the HDMI cable by using, e.g., optical fibers normally capable of transmitting signals only uni-directionally, no video signal can be transmitted from the transmitter to the receiver if the HDMI cable is reversely connected to the transmitter and receiver. Therefore, demands have arisen for a cable capable of detecting the transmission direction of a video signal and performing processing in accordance with the detected video signal transmission direction.

BRIEF DESCRIPTION OF THE DRAWINGS

A general architecture that implements the various feature of the invention will now be described with reference to the drawings. The drawings and the associated descriptions are provided to illustrate embodiments and not to limit the scope of the invention.

FIG. 1 is an exemplary view showing the outer appearance of a cable according to an embodiment, i.e., an exemplary view showing a cable connected to two audiovisual apparatuses;

DETAILED DESCRIPTION

Figure 2:
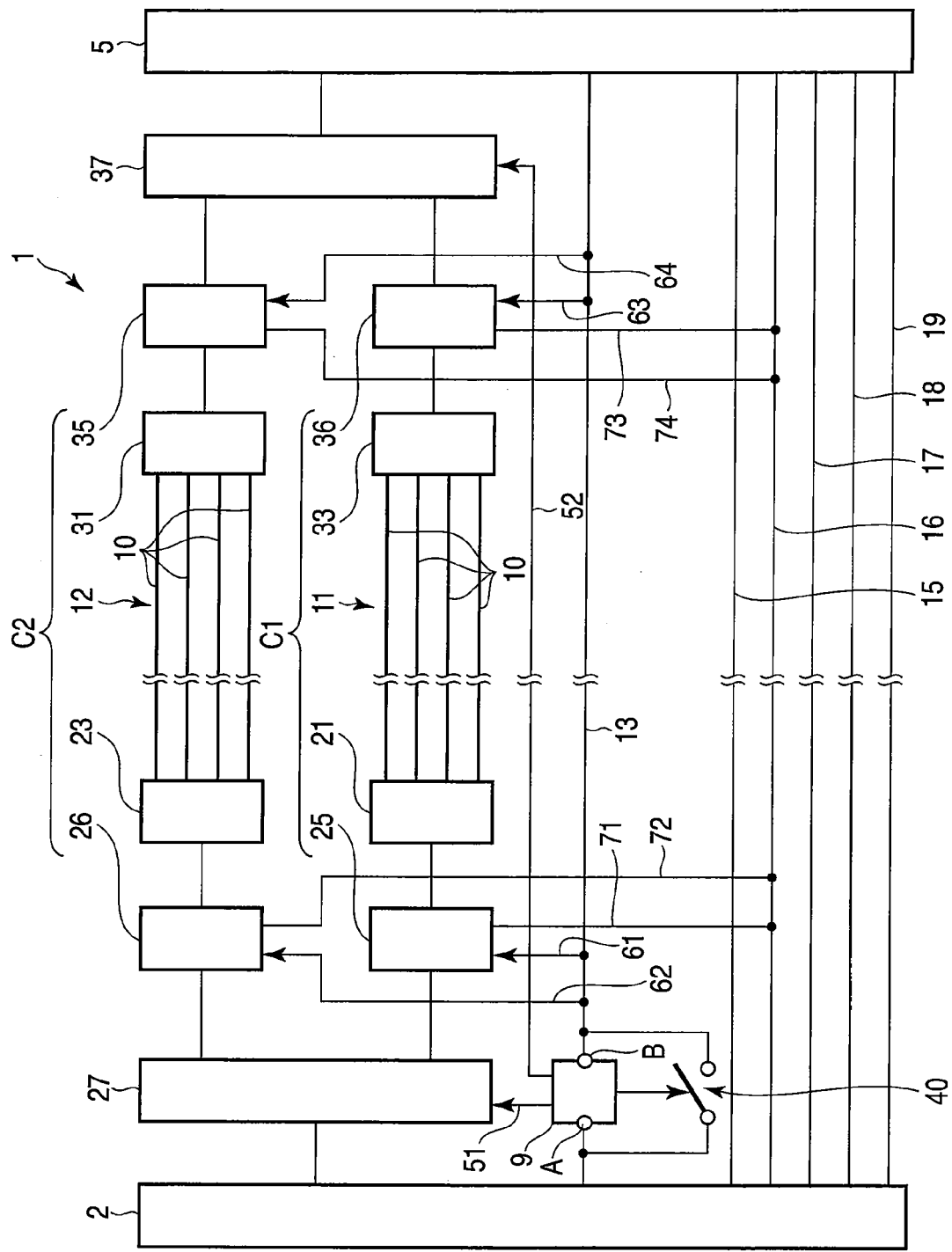
FIG. 2 is an exemplary block diagram showing an outline of the arrangement of the cable in the embodiment.

Various embodiments will be described hereinafter with reference to the accompanying drawings. In general, according to one embodiment, there is provided a cable comprising a first plug and a second plug, a voltage application line which is formed by a metal wire connected between the first plug and the second plug, and to which a voltage is applied from one of the first plug and the second plug, a plurality of optical fibers which are connected between the first plug and the second plug, and transmit a video signal, and a controller connected to the voltage application line, and configured to detect a transmission direction of the video signal between the first plug and the second plug by sensing a change in voltage of the voltage application line and perform processing in accordance with the detected transmission direction.

A cable according to one embodiment will be explained in detail below. As shown in FIG. 1, a cable 1 is an interface that connects two audiovisual apparatuses 100 and 200. The cable 1 complies the High-Definition Multimedia Interface (HDMI) standard. In this embodiment, the audiovisual apparatus 100 is a transmitter, and the audiovisual apparatus 200 is a receiver. An example of the transmitter is a digital video disk (DVD) recorder. An example of the receiver is a digital television receiver.

The cable 1 includes first and second plugs 2 and 5 connectable to the audiovisual apparatuses 100 and 200, a first housing 3, a second housing 6, and a cable main body 8. The first plug 2 is attached to the first housing 3. The second plug 5 is attached to the second housing 6. The cable main body 8 has one end attached to the first housing 3, and the other end attached to the second housing 6.

In this embodiment, the first plug 2 is inserted into a receptacle 101 of the audiovisual apparatus 100. Consequently, the first plug 2 is fixed to a predetermined position, and a plurality of terminals ta1 to ta14 (to be described later) of the first plug 2 are connected to the audiovisual apparatus 100. The second plug 5 is inserted into a receptacle 201 of the audiovisual apparatus 200. Consequently, the second plug 5 is fixed to a predetermined position, and a plurality of terminals tb1 to tb14 (to be described later) of the second plug 5 are connected to the audiovisual apparatus 200.

As shown in FIGS. 1 and 2, the cable main body 8 includes a plurality of optical fibers 10, a power line 13 applied with +5V, for example, as a voltage application line, a Hot Plug Detect (HPD) signal line 15, a ground line 16, a DDC data signal line 17, a DDC clock signal line 18, and a Consumer Electronics Control (CEC) signal line 19. The plurality of optical fibers 10, power line 13, HPD signal line 15, ground line 16, DDC data signal line 17, DDC clock signal line 18, and CEC signal line 19 are bound into a bundle and covered with an electrical insulator (not shown). As will be described later, control signal lines for transmitting control signals as described above are made of metal wires.

The plurality of optical fibers 10 transmit a Transition Minimized Differential Signaling (TMDS) signal. The plurality of optical fibers 10 form a first optical fiber group 11 and second optical fiber group 12.

The TMDS signal includes an optical video signal containing a video component and audio component, and a clock signal synchronized with pixel data of the optical video signal. The TMDS signal is transmitted through one of the first optical fiber group 11 and second optical fiber group 12. In this embodiment, the TMDS signal is transmitted through the first optical fiber group 11.

Figure 3:
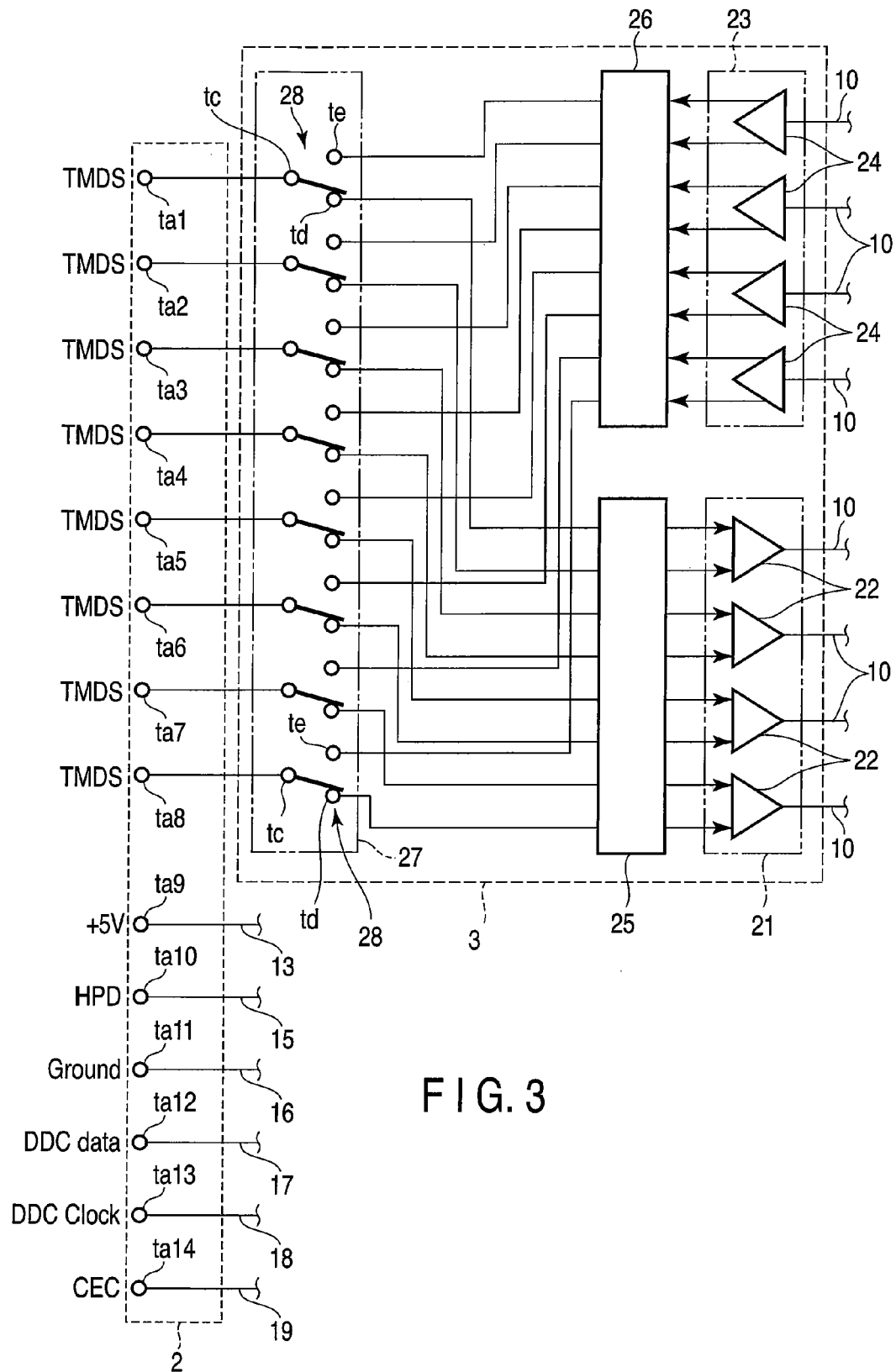
FIG. 3 is an exemplary block diagram showing an outline of the internal arrangement of a first plug and first housing shown in FIG. 1 in more detail than in FIG. 2 in the embodiment.
Figure 4:
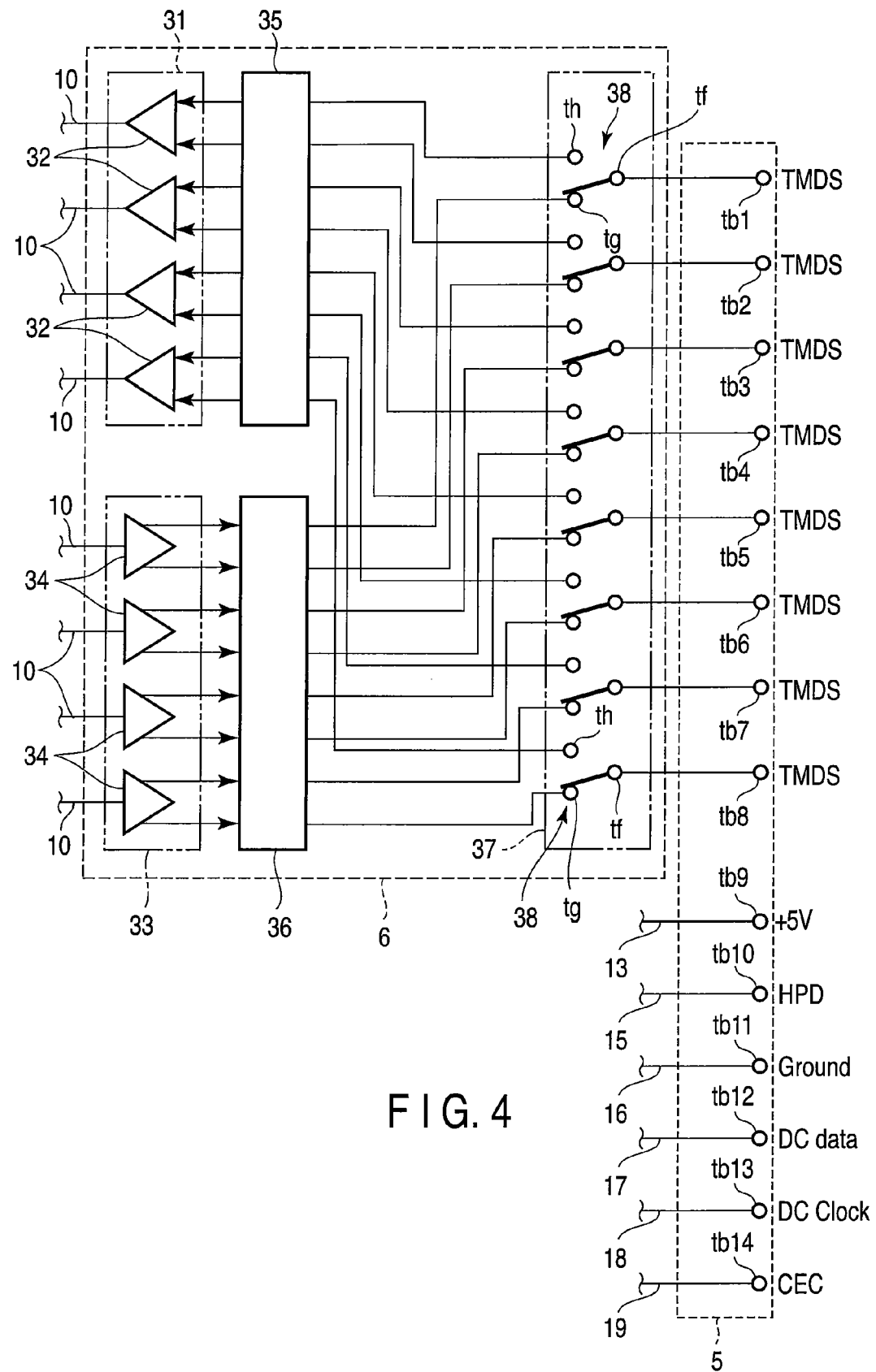
FIG. 4 is an exemplary block diagram showing an outline of the internal arrangement of a second plug and second housing shown in FIG. 1 in more detail than in FIG. 2 in the embodiment.
Figure 5:
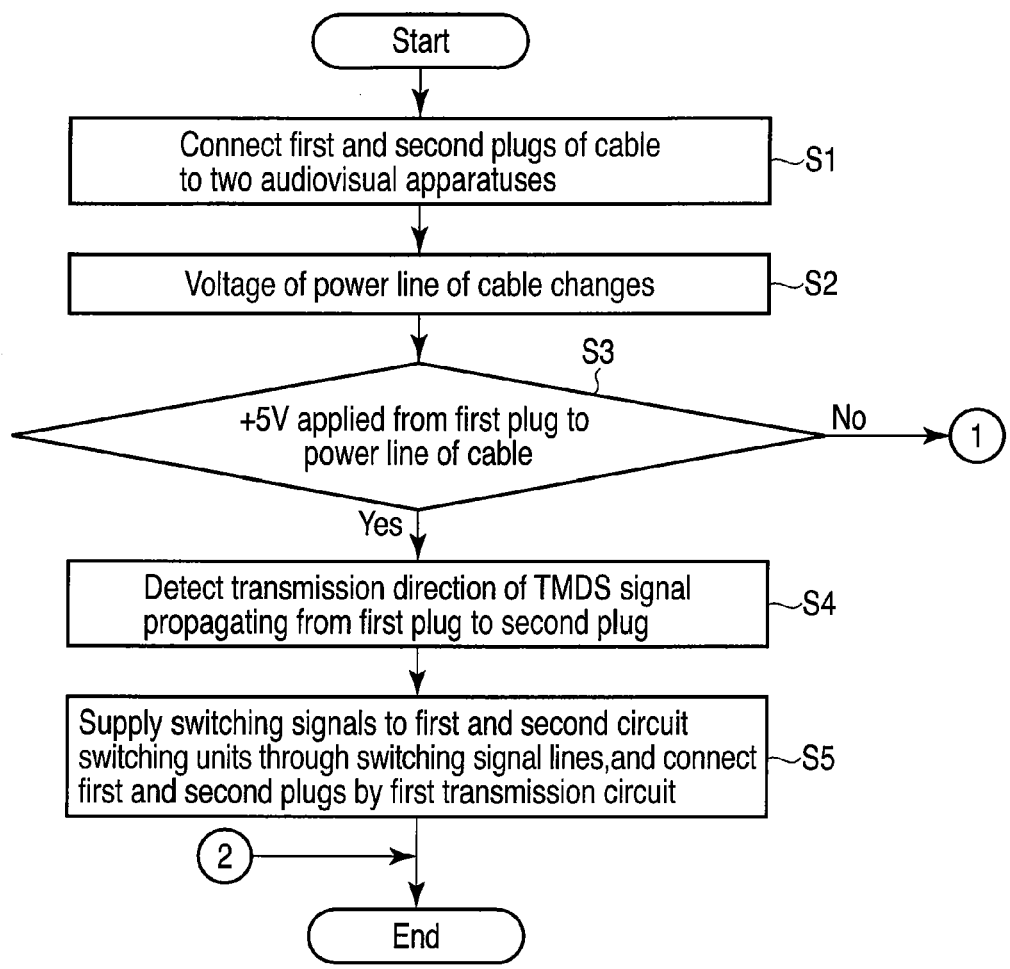
FIG. 5 is an exemplary flowchart showing a method of switching first and second transmission circuits performed by the cable in the embodiment.
Figure 6:
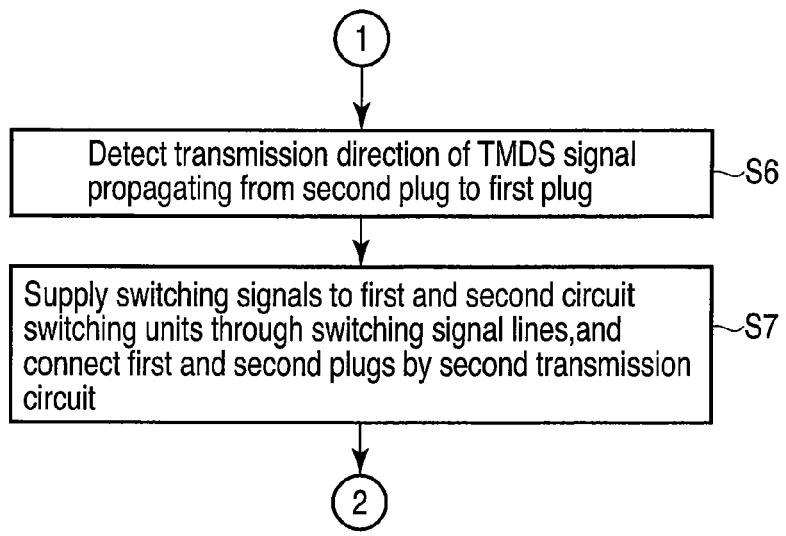
FIG. 6 is an exemplary flowchart following FIG. 5 and showing the method of switching the first and second transmission circuits performed by the cable in the embodiment.

As shown in FIGS. 2 to 4, the power line 13 is formed by a metal wire connected between terminals ta9 and tb9. When the first plug 2 or second plug 5 is connected to one of the audiovisual apparatuses 100 and 200, the audiovisual apparatus 100 or 200 applies a voltage of +5 V to the power line 13. In this embodiment, the audiovisual apparatus 100 applies a voltage of +5 V to the power line 13 via the first plug 2.

The cable 1 further includes a microcomputer 9 as a controller and a switching element 40. The microcomputer 9 has terminals A and B connected to the power line 13 as a voltage application line. The switching element 40 is formed by a TFT (Thin Film Transistor) or the like, and connected in parallel to the microcomputer 9.

The microcomputer 9 senses the change in voltage of the power line 13. More specifically, the microcomputer 9 monitors whether a voltage of +5 V is applied to terminal A or B, thereby detecting the transmission direction of the TMDS signal between the audiovisual apparatuses 100 and 200 (between the first plug 2 and second plug 5).

For example, when the microcomputer 9 confirms that a voltage of +5 V is applied to terminal A and is not applied to terminal B, the microcomputer 9 determines that the first plug 2 is connected to the audiovisual apparatus 100 as a transmitter, and detects the transmission direction of the TMDS signal propagating from the first plug 2 to the second plug 5.

On the other hand, when the microcomputer 9 confirms that a voltage of +5 V is not applied to terminal A but applied to terminal B, the microcomputer 9 determines that the second plug 5 is connected to the audiovisual apparatus 100 as a transmitter, and detects the transmission direction of the TMDS signal propagating from the second plug 5 to the first plug 2.

After sensing the change in voltage of the power line 13, the microcomputer 9 supplies a switching signal to the switching element 40, thereby switching the switching element 40 from an OFF state (non-conductive state) to an ON state (conductive state). Since a voltage of +5 V is applied from the audiovisual apparatus 100 to the audiovisual apparatus 200 via the first plug 2, power line 13, switching element 40, and second plug 5, it is possible to notify the audiovisual apparatus 200 that the cable 1 is connected to the audiovisual apparatuses 100 and 200.

The HPD signal line 15 is formed by a metal wire connected between terminals ta10 and tb10. The HPD signal line 15 transmits, from the audiovisual apparatus 200 to the audiovisual apparatus 100, an HPD signal indicating that the audiovisual apparatus 200 has made preparations for the reception of the TMDS signal. The audiovisual apparatus 200 outputs the HPD signal when a voltage of +5 V is applied.

The ground line 16 is formed by a metal wire connected between terminals ta11 and tb11, and grounded.

The DDC data signal line 17 is formed by a metal wire connected between terminals ta12 and tb12, and bidirectionally transmits a DDC data signal between the audiovisual apparatuses 100 and 200.

The DDC clock signal line 18 is formed by a metal wire connected between terminals ta13 and tb13, and bidirectionally transmits a DDC clock signal between the audiovisual apparatuses 100 and 200.

The DDC data signal and DDC clock signal contain Extended Display Identification Data (EDID), and perform authentication between the audiovisual apparatuses 100 and 200.

The CEC signal line 19 is formed by a metal wire connected between terminals ta14 and tb14, and bidirectionally transmits a CEC signal between the audiovisual apparatuses 100 and 200. The CEC signal controls the entire system.

The cable 1 further includes a first transmission circuit C1, second transmission circuit C2, first circuit switching unit 27, and second circuit switching unit 37.

The first transmission circuit C1 includes the first optical fiber group 11, a first electrophoto-conversion unit 21, a driver 25, a first photoelectric conversion unit 33, and an amplifier 36.

The first electrophoto-conversion unit 21 is connected between the first optical fiber group 11 and first plug 2. The first electrophoto-conversion unit 21 converts an electrical TMDS signal input from the first plug 2 into an optical TMDS signal, and inputs the optical TMDS signal to the first optical fiber group 11. The first electrophoto-conversion unit 21 includes a plurality of laser diodes 22 for converting an electrical signal into an optical signal.

The driver 25 is connected between the first electrophoto-conversion unit 21 and first plug 2. The driver 25 has a +5V-power input terminal connected to the HPD signal line 15 via a metal wire 61, and a ground terminal connected to the ground line 16 via a metal wire 71. The driver 25 drives the plurality of laser diodes 22, and outputs an input electrical TMDS signal to the first electrophoto-conversion unit 21.

The first photoelectric conversion unit 33 is connected between the first optical fiber group 11 and second plug 5. The first photoelectric conversion unit 33 converts an optical TMDS signal output from the first optical fiber group 11 into an electrical TMDS signal, and outputs the electrical TMDS signal to the second plug 5. The first photoelectric conversion unit 33 includes a plurality of photodiodes 34 for converting an optical signal into an electrical signal.

The amplifier 36 is connected between the first photoelectric conversion unit 33 and second plug 5. The amplifier 36 has a +5V-power input terminal connected to the HPD signal line 15 via a metal wire 63, and a ground terminal connected to the ground line 16 via a metal wire 73. The amplifier 36 amplifiers an input electrical TMDS signal, and outputs the amplified signal to the second plug 5.

The second transmission circuit C2 includes the second optical fiber group 12, a second electrophoto-conversion unit 31 formed similarly to the first electrophoto-conversion unit 21, a driver 35 formed similarly to the driver 25, a second photoelectric conversion unit 23 formed similarly to the first photoelectric conversion unit 33, and an amplifier 26 formed similarly to the amplifier 36.

When the audiovisual apparatus 100 is connected to the first plug 2 and the audiovisual apparatus 200 is connected to the second plug 5, the second transmission line C2 is not used in the transmission of the TMDS signal. However, the following explanation will be made by assuming that the second transmission line C2 is used in the transmission of the TMDS signal.

The second electrophoto-conversion unit 31 is connected between the second optical fiber group 12 and second plug 5. The second electrophoto-conversion unit 31 converts an electrical TMDS signal input from the second plug 5 into an optical TMDS signal, and inputs the optical TMDS signal to the second optical fiber group 12. The second electrophoto-conversion unit 31 includes a plurality of laser diodes 32 for converting an electrical signal into an optical signal.

The driver 35 is connected between the second electrophoto-conversion unit 31 and second plug 5. The driver 35 has a +5V-power input terminal connected to the HPD signal line 15 via a metal wire 64, and a ground terminal connected to the ground line 16 via a metal wire 74. The driver 35 drives the plurality of laser diodes 32, and outputs an input electrical TMDS signal to the second electrophoto-conversion unit 31.

The second photoelectric conversion unit 23 is connected between the second optical fiber group 12 and first plug 2. The second photoelectric conversion unit 23 converts an optical TMDS signal output from the second optical fiber group 12 into an electrical TMDS signal, and outputs the electrical TMDS signal to the first plug 2. The second photoelectric conversion unit 23 includes a plurality of photodiodes 24 for converting an optical signal into an electrical signal.

The amplifier 26 is connected between the second photoelectric conversion unit 23 and first plug 2. The amplifier 26 has a +5V-power input terminal connected to the HPD signal line 15 via a metal wire 62, and a ground terminal connected to the ground line 16 via a metal wire 72. The amplifier 26 amplifiers an input electrical TMDS signal, and outputs the amplified signal to the first plug 2.

The cable 1 further includes a first circuit switching unit 27 and second circuit switching unit 37. The first circuit switching unit 27 is connected to the microcomputer 9 via a switching signal line 51 made of a metal wire. The second circuit switching unit 37 is connected to the microcomputer 9 via a switching signal line 52 made of a metal wire. Note that the switching signal line 52 forms the cable main body 8, and is bundled together with the power line 13 and the like.

The first circuit switching unit 27 includes a plurality of switching elements 28. Each switching element 28 has a terminal tc connected to one of terminals ta1 to ta8, a terminal td connected to the driver 25, and a terminal te connected to the amplifier 26. The switching element 28 can perform switching so as to selectively connect terminal tc and one of terminals td and te.

The second circuit switching unit 37 is formed similarly to the first circuit switching unit 27. The second circuit switching unit 37 includes a plurality of switching elements 38. Each switching element 38 has a terminal tf connected to one of terminals tb1 to tb8, a terminal tg connected to the amplifier 36, and a terminal th connected to the driver 35. The switching element 38 can perform switching so as to selectively connect terminal tf and one of terminals tg and th.

The microcomputer 9 controls the first circuit switching unit 27 and second circuit switching unit 37 to connect the first plug 2 and second plug 5 by one of the first transmission circuit C1 and second transmission circuit C2. When controlling the first circuit switching unit 27 and second circuit switching unit 37, the microcomputer 9 supplies switching signals to the first circuit switching unit 27 and second circuit switching unit 37 through the switching signal lines 51 and 52, respectively.

As shown in FIGS. 1 to 4, the first electrophoto-conversion unit 21, second photoelectric conversion unit 23, driver 25, amplifier 26, first circuit switching unit 27, and microcomputer 9 are accommodated in the first housing 3. The second electrophoto-conversion unit 31, first photoelectric conversion unit 33, driver 35, amplifier 36, and second circuit switching unit 37 are accommodated in the second housing 6. Although the microcomputer 9 is accommodated in the first housing 3 in this embodiment, the invention is not limited to this, and the microcomputer 9 need only be accommodated in one of the first housing 3 and second housing 6.

As described above, the microcomputer 9 detects the transmission direction of the TMDS signal between the first plug 2 and second plug 5, and performs processing in accordance with the detected transmission direction. In this embodiment, the microcomputer 9 detects the transmission direction of the TMDS signal propagating from the audiovisual apparatus 100 to the audiovisual apparatus 200, and supplies switching signals to the first circuit switching unit 27 and second circuit switching unit 37, thereby connecting terminals tc and td, and terminals tf and tg.

Consequently, the microcomputer 9 can connect the first plug 2 and second plug 5 by the first transmission circuit C1, and transmit the TMDS signal from the audiovisual apparatus 100 to the audiovisual apparatus 200 by using the first transmission circuit C1.

The cable 1 is formed as described above.

Next, a method of switching the first transmission circuit C1 and second transmission circuit C2 performed by the above-mentioned cable 1 will be explained below. In particular, the processing performed by the microcomputer 9 in accordance with the TMDS signal transmission direction detected by the microcomputer 9 will be explained. In this explanation, one of the first plug 2 and second plug 5 of the cable 1 is connected to the audiovisual apparatus 100, and the other is connected to the audiovisual apparatus 200.

As shown in FIGS. 1 to 5, when the method of switching the first transmission circuit C1 and second transmission circuit C2 is started, the first plug 2 and second plug 5 of the cable 1 are connected to the two audiovisual apparatuses 100 and 200 in step S1. In step S2, therefore, the voltage of the power line 13 of the cable 1 changes from zero to +5 V.

Then, in step S3, the microcomputer 9 determines whether a voltage of +5 V is applied to the power line 13 from the first plug 2.

If a voltage of +5 V is applied from the first plug 2, the microcomputer 9 determines that the first plug 2 is connected to the audiovisual apparatus 100 as a transmitter. Accordingly, the process advances to step S4, and the microcomputer 9 detects the transmission direction of the TMDS signal propagating from the first plug 2 to the second plug 5.

After that, in step S5, the microcomputer 9 supplies switching signals to the first circuit switching unit 27 and second circuit switching unit 37 through the switching signal lines 51 and 52, respectively, thereby connecting the first plug 2 and second plug 5 by the first transmission circuit C1. In this way, the above-mentioned switching performed by the cable 1 is complete.

As shown in FIGS. 1 to 6, if it is determined in step S3 that a voltage of +5 V is not applied from the first plug 2 but applied from the second plug 5, the microcomputer 9 determines that the second plug 5 is connected to the audiovisual apparatus 100 as a transmitter, and the process advances to step S6. In step S6, the microcomputer 9 detects the transmission direction of the TMDS signal propagating from the second plug 5 to the first plug 2.

After that, in step S7, the microcomputer 9 supplies switching signals to the first circuit switching unit 27 and second circuit switching unit 37 through the switching signal lines 51 and 52, respectively, thereby connecting the first plug 2 and second plug 5 by the second transmission circuit C2. In this manner, the above-mentioned switching performed by the cable 1 is complete.

The cable 1 configured as described above includes the first plug 2, the second plug 5, the power line 13 to which a voltage of +5 V is applied from one of the first plug 2 and second plug 5, the plurality of optical fibers 10 for transmitting the TMDS signal containing a video signal, and the microcomputer 9.

The microcomputer 9 is connected to the power line 13, detects the transmission direction of the TMDS signal between the first plug 2 and second plug 5 by sensing the change in voltage of the power line 13, and performs processing in accordance with the detected transmission direction. In this embodiment, the microcomputer 9 can selectively connect the first plug 2 and second plug 5 by one of the first transmission circuit C1 and second transmission circuit C2 in accordance with the detected transmission direction.

The microcomputer 9 can automatically switch the TMDS signal transmission directions. Therefore, when the first plug 2 is connected to the audiovisual apparatus 100 and the second plug 5 is connected to the audiovisual apparatus 200, the cable 1 can transmit the TMDS signal by using the first transmission circuit C1. When the first plug 2 is connected to the audiovisual apparatus 200 and the second plug 5 is connected to the audiovisual apparatus 100, the cable 1 can transmit the TMDS signal by using the second transmission circuit C2.

The cable 1 is convenient because it can transmit the TMDS signal regardless of the way it is connected to the audiovisual apparatuses 100 and 200. The cable 1 can solve the problem that may arise when using the conventional cable capable of transmitting the TMDS signal only uni-directionally, i.e., the problem that the cable is reversely connected between a transmitter and receiver and hence cannot transmit the TMDS signal. If the cable is reversely connected between a transmitter and receiver, it is, of course, necessary to reconnect the cable.

From the foregoing, it is possible to obtain the cable 1 capable of detecting the transmission direction of the TMDS signal containing a video signal, and performing processing in accordance with the detected TMDS signal transmission direction.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

For example, the microcomputer 9 is connected to the power line 13, but the invention is not limited to this. That is, the microcomputer 9 need only be connected to a line made of a metal wire connected between the first plug 2 and second plug 5, and functioning as a voltage application line to which a voltage is applied from one of the first plug 2 and second plug 5.

The cable of the embodiment comprises at least a first plug and a second plug, a voltage application line which is formed by a metal wire connected between the first plug and the second plug, and to which a voltage is applied from one of the first plug and the second plug, a plurality of optical fibers which are connected between the first plug and the second plug, and transmit a video signal, and a controller which is connected to the voltage application line, detects a transmission direction of a video signal between the first plug and the second plug by sensing a change in voltage of the voltage application line, and performs processing in accordance with the detected transmission direction.

The cable of the embodiment can also include a light-emitting diode as a light-emitting element formed in at least one of the first housing 3 and second housing 6. For example, when the cable is reversely connected to a transmitter and receiver, the light-emitting diode can be turned on under the control of the controller (microcomputer 9).

The invention is applicable not only to a cable complying with the HDMI standard, but also to a cable complying with the Digital Visual Interface (DVI) standard, and a cable complying with neither the HDMI standard nor the DVI standard.

What is claimed is:

1. A cable comprising:
   a first plug and a second plug;
   a voltage application line including a metal wire connected between the first plug and the second plug to which a voltage is applied from one of the first plug and the second plug;
   a first transmission line including a first plurality of optical fibers connected between the first plug and the second plug and configured to transmit a video signal from the first plug to the second plug;
   a second transmission line including a second plurality of optical fibers connected between the first plug and the second plug and configured to transmit the video signal from the second plug to the first plug;
   a first circuit switching unit configured to connect the first plug to one of the first transmission line or the second transmission line;
   a second circuit switching unit configured to connect the second plug to one of the first transmission line and the second transmission line; and
   a controller connected to the voltage application line and configured to detect a transmission direction of the video signal by determining which of the first plug or the second plug has applied the voltage to the voltage application line, the controller further configured to control the first circuit switching unit and the second circuit switching unit in accordance with the detected transmission direction and connect the first plug and the second plug with one of the first transmission line and the second transmission line.

2. The cable of claim 1, further comprising:
   a first housing to which the first plug is attached; and
   a second housing to which the second plug is attached,
   wherein the controller is accommodated in one of the first housing and the second housing.

3. The cable of claim 1, further comprising:
   a first switching signal line formed by a metal wire connected to the controller and the first circuit switching unit; and
   a second switching signal line formed by a metal wire connected to the controller and the second circuit switching unit,
   wherein the controller is configured to supply switching signals to the first circuit switching unit and the second circuit switching unit through the first and second switching signal lines when controlling the first circuit switching unit and the second circuit switching unit.

4. The cable of claim 1, further comprising:
a control signal line formed by a metal wire connected between the first plug and the second plug, wherein the control signal line transmits a control signal.

5. The cable of claim 1, complying with the High-Definition Multimedia Interface standard.

6. A cable comprising:
a first plug and a second plug;
a voltage application line including a metal wire connected between the first plug and the second plug to which a voltage is applied from one of the first plug and the second plug;
a first transmission line comprising:
   a first plurality of optical fibers connected between the first plug and the second plug and configured to transmit a video signal,
   a first electrophoto-conversion unit connected between the first plurality of optical fibers and the first plug and configured to convert an electrical video signal input at the first plug into an optical video signal and transmit the optical video signal to the first plurality of optical fibers, and
   a first photoelectric conversion unit connected between the first plurality of optical fibers and the second plug and configured to convert the optical video signal output from the first plurality of optical fibers into an electrical video signal and transmit the electrical video signal to the second plug;
a second transmission line comprising:
   a second plurality of optical fibers connected between the first plug and the second plug and configured to transmit a video signal,
   a second electrophoto-conversion unit connected between the second plurality of optical fibers and the second plug and configured to convert an electrical video signal input at the second plug into an optical video signal and transmit the optical video signal to the second plurality of optical fibers, and
   a second photoelectric conversion unit connected between the second plurality of optical fibers and the first plug and configured to convert the optical video signal output from the second plurality of optical fibers into an electrical video signal and transmit the electrical video signal to the first plug;
a first circuit switching unit configured to connect the first plug with one of the first electrophoto-conversion unit and the second photoelectric conversion unit;
a second circuit switching unit configured to connect the second plug with one of the first photoelectric conversion unit and the second electrophoto-conversion unit and;
a controller connected to the voltage application line and configured to detect a transmission direction of the video signal by determining which of the first plug and second plug has applied the voltage to the voltage application line, the controller further configured to control the first circuit switching unit and the second circuit switching unit in accordance with the detected transmission direction and connect the first plug and the second plug with one of the first transmission line and the second transmission line.

7. The cable of claim 6, further comprising:
a first housing to which the first plug is attached; and
a second housing to which the second plug is attached,
wherein the controller is accommodated in one of the first housing and the second housing.

8. The cable of claim 6, further comprising:
a first switching signal line formed by a metal wire connected to the controller and the first circuit switching unit; and
a second switching signal line formed by a metal wire connected to the controller and the second circuit switching unit,
wherein the controller is configured to supply switching signals to the first circuit switching unit and the second circuit switching unit through the first and second switching signal lines when controlling the first circuit switching unit and the second circuit switching unit.

9. The cable of claim 6, further comprising:
a control signal line formed by a metal wire connected between the first plug and the second plug, wherein the control signal line transmits a control signal.

10. The cable of claim 6, complying with the High-Definition Multimedia Interface standard.

* * * * *